United States Patent
Bernauer et al.

(10) Patent No.: US 6,362,582 B1
(45) Date of Patent: Mar. 26, 2002

(54) ELECTRONICALLY COMMUTATED MOTOR

(75) Inventors: Christof Bernauer, Forbach; Wolfgang Krauth, Achern-Sasbachried, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/446,293

(22) PCT Filed: Jun. 8, 1998

(86) PCT No.: PCT/DE98/01558

§ 371 Date: Apr. 19, 2000

§ 102(e) Date: Apr. 19, 2000

(87) PCT Pub. No.: WO98/58442

PCT Pub. Date: Dec. 23, 1998

(30) Foreign Application Priority Data

Jun. 17, 1997 (DE) .......................................... 197 25 521

(51) Int. Cl.$^7$ ................................ H02P 6/00; H02P 7/29
(52) U.S. Cl. ........................................ 318/254; 318/431
(58) Field of Search ................................. 318/599, 138, 318/254, 439, 430–433, 700, 720, 722, 724

(56) References Cited

U.S. PATENT DOCUMENTS 4,959,598 A * 9/1990 Yoshida et al. ............. 318/599
5,232,052 A * 8/1993 Arvidson et al. ............. 169/14
5,289,560 A * 2/1994 Abney ........................ 388/811

FOREIGN PATENT DOCUMENTS

| EP | 0 483 894 | 5/1992 |
| JP | 07 300011 | 11/1995 |
| WO | WO 96 01521 | 1/1996 |

* cited by examiner

*Primary Examiner*—Bentsu Ro
(74) *Attorney, Agent, or Firm*—Kenyon & Kenyon

(57) ABSTRACT

An electronically commutated motor includes a stator carrying a plurality of winding strands and a rotor in which the individual winding strands are controlled via power amplifiers in staggered periods of time, the periods being subdivided into control time and idle time. To reduce the power loss in the power amplifiers and to increase the efficiency in the range of high currents, that the control times are subdivided into an initial time segment and a final time segment. At low motor currents pulsing occurs only in the initial or final time segments in pulse width modulation, while at high currents complete switching through takes place in the initial time segments and additionally in the final time segment for a more or less long period of time or in the final time segments and additionally in the initial time segments for a more or less long period of time.

17 Claims, 3 Drawing Sheets

ELECTRONICALLY COMMUTATED MOTOR

FIELD OF THE INVENTION

The present invention relates to an electronically commutated motor including a stator carrying a plurality of winding strands and a rotor in which the individual winding strands are controlled via power amplifiers in staggered periods of time, the periods being subdivided into control time and idle time.

BACKGROUND INFORMATION

In conventional electronically commutated motors, the motor power output is influenced by the pulsing of the power amplifiers via pulse width modulation or by variation of the limit switching time of the power amplifiers. Normally, the current is pulsed over the total time of control or varied in the limit switching time. At high motor currents, this results in high switching losses which increase roughly quadratically with the current. These high switching losses reduce the efficiency of the motor and also result in a considerable thermal load on the power amplifiers which frequently can also result in a failure of the electronic switching element used in the power amplifiers.

An object of the present invention is to improve the control of an electronically commutated motor in such a way that the high switching losses and an increased loading of the power amplifiers can be avoided at high motor currents.

According to the present invention, the object is achieved firstly in that the control times are subdivided into an initial time segment and a final time segment, that at low motor currents the power amplifiers are pulsed in the initial time segments only via pulse width modulation and that at high motor currents the power amplifiers are completely switched through additionally in the final time segments with a more or less long closing time, or secondly in that the control times are subdivided into an initial time segment and a final time segment, that at low motor currents the power amplifiers are pulsed in the final time segments via pulse width modulation and that at high motor currents the power amplifiers are switched through completely in the total final time segments and additionally in the initial time segments with a more or less long closing time.

In an embodiment according to the present invention the pulse width modulation is only carried out in the initial time segment or in the final time segment of the control time and with a pulse width that becomes greater with increasing motor current. At high motor currents, an additional closing time is added to the initial time segment or the final time segment, the additional closing time becoming greater with increasing motor current and ultimately being able to encompass the total final time segment or initial time segment. During the initial or final time segment and during the additional closing time, the power amplifier is completely switched through in order to avoid switching losses.

The two operating modes of low and high current can be separated most readily by the fact that the areas with low and high motor currents are differentiated by specification of a certain current value, the pulse width becoming greater with increasing low current and the closing time becoming greater with increasing high current.

If it is provided according to one embodiment according to the present invention that the initial time segments of the control times of the periods for the power amplifiers partially overlap and are only pulsed in the non-overlapping partial segments, then the individual winding currents do not overlap and no gap occurs in the total current if at high currents care is taken that the closing time immediately follows the initial time segment and extends more or less over the final time segment.

The control time and the idle time in the periods may be selected to be of equal length while the control time extends over approximately ⅔ of the period.

The pulse frequency for the pulse width modulation may be selected above the audible range of the human ear, e.g., 20 kHz.

The control time is increased by the fact that the closing time immediately follows the initial time segment and extends more or less over the final time segment or that the closing time extends more or less into the assigned initial time segment of the period.

The control circuit with the power amplifiers controlled in this manner can be used not only for an electronically commutated motor, but also for other loads that can also be controlled and regulated with it with correspondingly reduced switching losses and increased efficiency.

DETAILED DESCRIPTION

Figure 1:
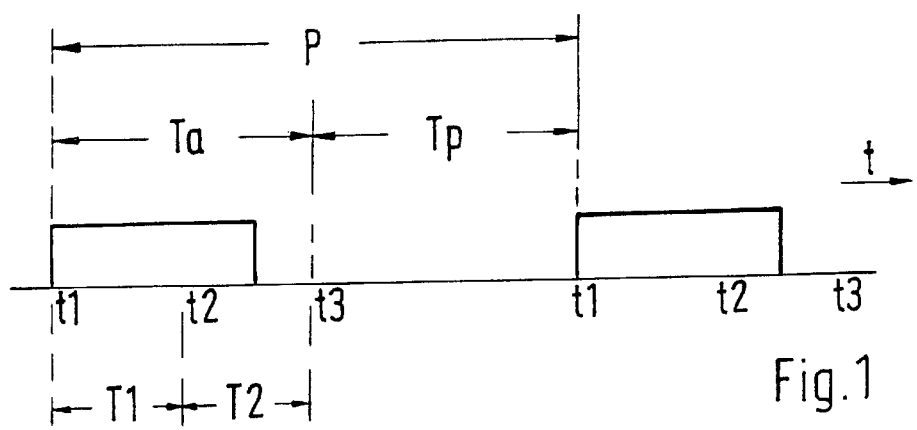
FIG. 1 shows a time diagram of a control according to the present invention.

As FIG. 1 shows, the power amplifiers are controlled periodically, period P including a control time Ta and an idle time Tp. In the embodiment shown, control time Ta and idle time Tp are of equal length. Control time Ta itself is subdivided into an initial time segment T1 and a final time segment T2. Initial time segment T1 always starts at a time t1 and extends to a time t2. Initial time segment T1 is immediately followed by final time segment T2 so that it extends from time t2 to time t3 which indicates the end of final time segment T2.

Figure 2:
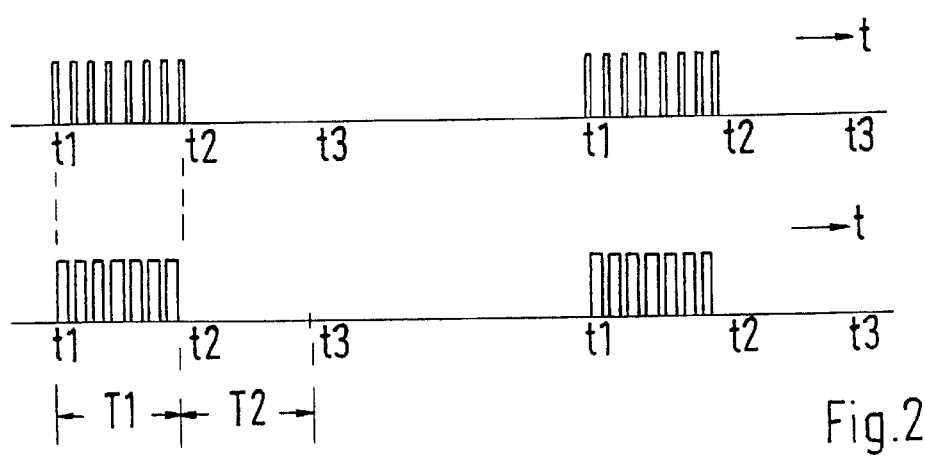
FIG. 2 shows a time diagram of the control with pulse width modulation according to the present invention.
Figure 3:
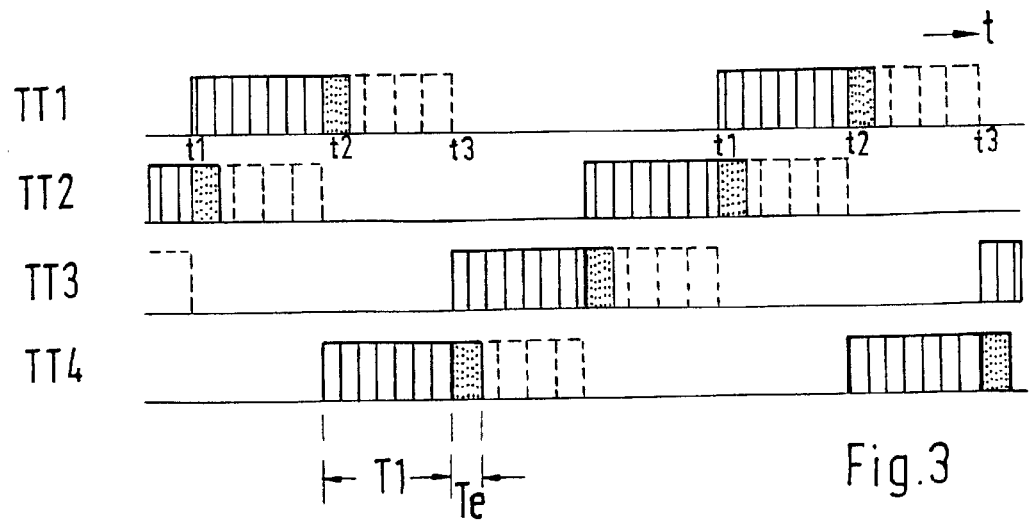
FIG. 3 shows a diagram illustrating four power amplifiers controlling four winding strands of an electronically commutated motor according to the present invention.

If the motor load is such that only low motor currents are needed up to a specified current value, then the power amplifiers are pulsed in initial time segment T1 via pulse width modulation (PWM) as shown in FIG. 2. At the same time, in the operating range the pulse width becomes greater with increasing current. Final time segment T2 stays at zero current. If the required current exceeds the specified current value, then complete activation takes place in initial time segment T1 and time t2 is immediately followed by a closing time Te in which power amplifiers TT1 to TT4 are also completely switched through as shown in FIG. 3. Closing time Te becomes greater with increasing current demand until it ultimately encompasses the entire final time segment T2. As can be seen in FIG. 3, periods P of four power amplifiers TT1 to TT4, for example, are staggered in time in such a way that initial time segments T1 overlap by 10%, for example. If then only roughly 90% of initial time segments T1 are pulsed via pulse width modulation, then the currents of the individual power amplifiers do not overlap and no gap occurs in the total current. A similar procedure is followed with a different number of power amplifiers.

Figure 4:
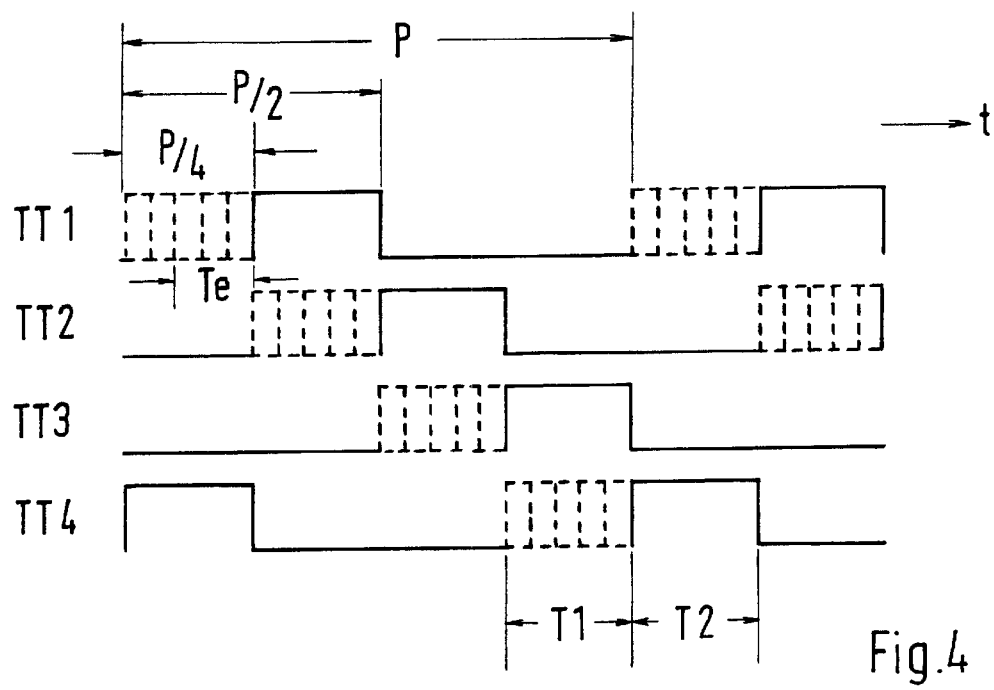
FIG. 4 shows another diagram illustrating the four power amplifiers controlling the four winding strands of the electronically commutated motor according to the present invention.

The control of power amplifiers TT1 to TT4 may, as is shown in FIG. 4, also take place with small motor currents in final time segment T2 of the control time with pulse width modulation (PWM), the pulse width becoming greater with increasing small motor current. Once a specified motor current is reached, then power amplifiers TT1 to TT4 are completely switched through in final time segments T2 and with further increasing motor current, an additional closing time Te is included in initial time segment T1 in which power amplifiers TT1 to TT4 are also completely switched through. Accordingly, with the same duration of initial time segments T1 and of final time segments T2 with one-fourth of period P, the additional closing time Te amounts to a maximum of one-fourth of period P.

Additional closing time Te no longer follows the end of initial time segment T1, as in FIG. 3, but rather immediately precedes the start of final time segment T2.

Figure 5:
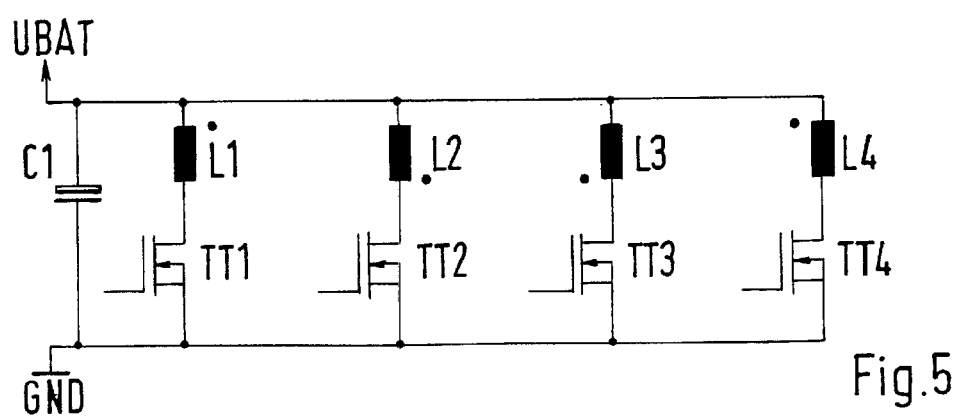
FIG. 5 shows a related control circuit according to the present invention.

FIG. 5 show a control circuit controlling for four power amplifiers TT1 to TT4 having a MQSFET transistor, in the output circuit of which one winding strand L1 to L4 each of an electronically commutated motor is arranged. Winding strands L1 to L4 are alternately wound in opposition so that the current direction can be the same. The control circuit is fed by a battery the voltage of which is smoothed with a capacitor C1. Correspondingly, the control currents shown in FIG. 3 are supplied to the four control electrodes of the MOSFET transistors at staggered intervals.

Figure 6:
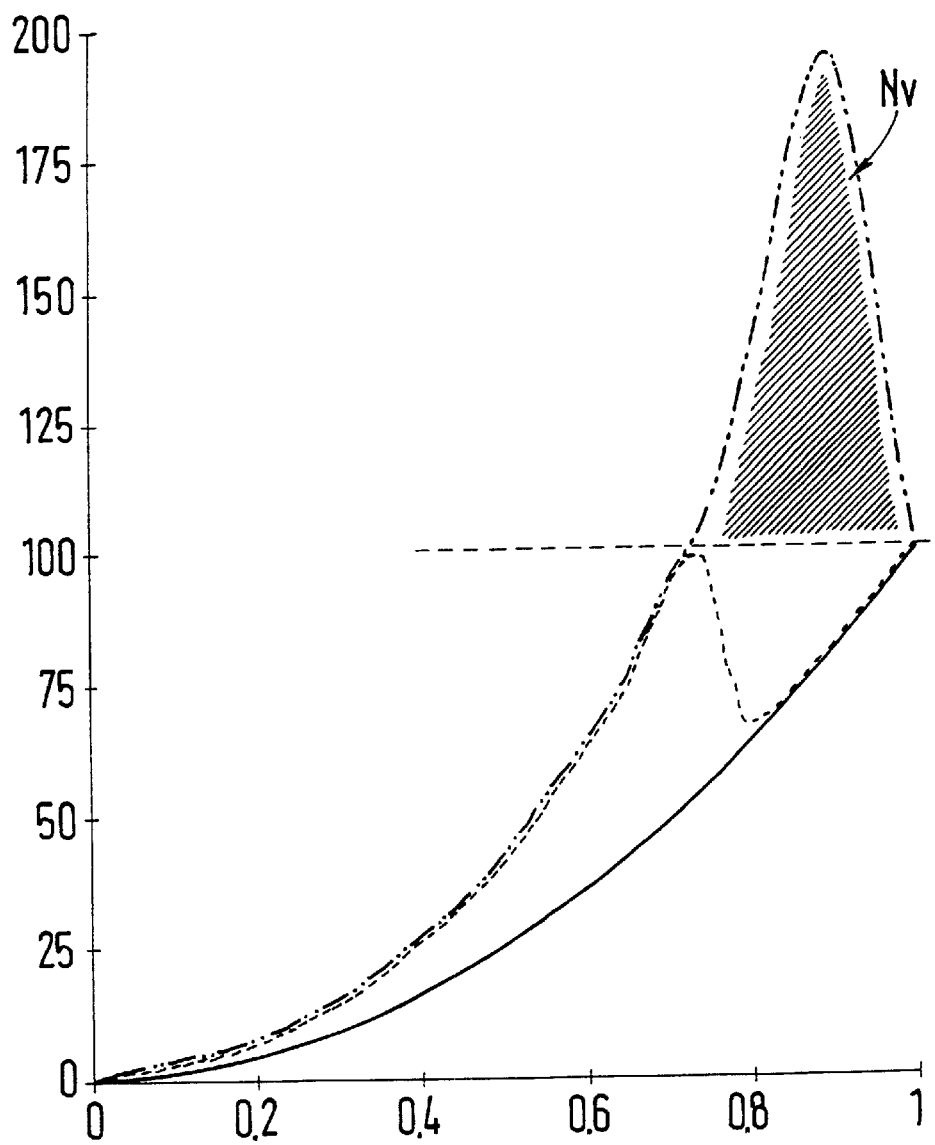
FIG. 6 shows a power diagram of a conventional control circuit and a control circuit according to the present invention.

In the diagram illustrated in FIG. 6 the power loss in a power amplifier is shown as a function of the control. The value 1 signifies a complete switching through of the power amplifier at full load and the value 100 signifies a reference value with power loss corresponding to the control in off-load operation at full load, as the solid characteristic curve shows. If pulsing via pulse width modulation takes place over entire control time Ta, then the loss characteristic marked by a dot-and-dash line with an increased power loss at high currents is obtained. With the method of operation according to the present invention, the characteristic marked by a broken line is obtained. The hatched area of the power loss identified as Nv does not occur with the control according to the present invention in comparison to the method of operation with pulsing during the total control time. Consequently, the load of the power amplifiers is reduced precisely in the range of high currents and the efficiency of the motor is increased. The characteristic curve does not exceed the power loss of asynchronous operation, it is favorable at high currents and reaches the loss value of 100 only at full load. The control circuit according to the present invention can also be used for the control of other loads with similar advantages.

What is claimed is:

1. An electronically commutated motor, comprising:
a stator carrying winding strands; and
a rotor in which individual winding strands are controlled via power amplifiers during staggered periods of time, the periods being divided into control time intervals and idle time intervals, the control time intervals being subdivided into initial time segments and final time segments in which time durations having low motor currents and high motor currents are differentiated by a threshold value, wherein, at the low motor currents, in the initial time segments, the power amplifiers are pulsed only via pulse width modulation, pulse widths lengthening with increasing low current, and, in the final time segments, the winding strands are disconnected from a supply of current, and wherein, at the high motor currents, in the initial time segments, the power amplifiers are completely switched through, and additionally, in the final time segments, the power amplifiers are completely switched through during closing time intervals, the closing time intervals lengthening with increasing high current.

2. The motor according to claim 1,
wherein the initial time segments overlap, the initial time segments including overlapping time portions and non-overlapping time portions, and
wherein the power amplifiers are only pulsed in the non-overlapping time portions.

3. The motor according to claim 1, wherein the control time intervals and the idle time intervals are of equal length in time.

4. The motor according to claim 1, wherein the control time intervals extend over approximately two-thirds of the periods.

5. The motor according to claim 1, wherein a pulse frequency of the pulse width modulation is greater than any frequency in an audible range of a human ear.

6. The motor according to claim 1, wherein a pulse frequency of the pulse width modulation is greater than approximately 20 kHz.

7. The motor according to claim 1, wherein the closing time intervals immediately follow the initial time segments and extend into the final time segments.

8. The motor according to claim 1, wherein the power amplifiers include MOSFETs.

9. An electronically commutated motor, comprising:
a stator carrying winding strands; and
a rotor in which individual winding strands are controlled via power amplifiers during staggered periods of time, the periods being divided into control time intervals and idle time intervals, the control time intervals being subdivided into initial time segments and final time segments in which time durations having low motor currents and high motor currents are differentiated by a threshold value, wherein, at the low motor currents, in the final time segments, the power amplifiers are pulsed only via pulse width modulation, pulse widths lengthening with increasing low current, and, in the initial time segments, the winding strands are disconnected from a supply of current, and wherein, at the high motor currents, in the final time segments, the power amplifiers are completely switched through, and additionally, in the initial time segments, the power amplifiers are completely switched through during closing time intervals, the closing time intervals lengthening with increasing high current.

10. The motor according to claim 9, wherein the final time segments are in immediate chronological sequence.

11. The motor according to claim 9, wherein the control time intervals and the idle time intervals are of equal length in time.

12. The motor according to claim 9, wherein the control time intervals extend over approximately two-thirds of the periods.

13. The motor according to claim 9, wherein a pulse frequency of the pulse width modulation is greater than any frequency in an audible range of a human ear.

14. The motor according to claim 9, wherein a pulse frequency of the pulse width modulation is greater than approximately 20 kHz.

15. The motor according to claim 9, wherein the closing time intervals extend into the initial time segments.

16. The motor according to claim 15, wherein the closing time intervals immediately precede the final time segments.

17. The motor according to claim 9, wherein the power amplifiers include MOSFETs.

* * * * *

UNITED STATES PATENT AND TRADEMARK OFFICE
CERTIFICATE OF CORRECTION

PATENT NO. : 6,362,582 B1
DATED : March 26, 2002
INVENTOR(S) : Bernauer et al.

It is certified that error appears in the above-identified patent and that said Letters Patent is hereby corrected as shown below:

Column 1,
Line 24, insert "SUMMARY OF THE INVENTION"

Column 3,
Line 31, change "battery the" to -- battery VBAT, the --

Signed and Sealed this

Thirteenth Day of July, 2004

JON W. DUDAS
*Acting Director of the United States Patent and Trademark Office*